United States Patent [19]

Yokoshima et al.

[11] Patent Number: 5,326,806
[45] Date of Patent: Jul. 5, 1994

[54] REINFORCED FLAME-RETARDANT POLYESTER RESIN COMPOSITIONS

[75] Inventors: Takahiro Yokoshima, Susono; Takuro Kitamura, Moka, both of Japan

[73] Assignee: General Electric Company, Pittsfield, Mass.

[21] Appl. No.: 996,297

[22] Filed: Dec. 23, 1992

[30] Foreign Application Priority Data

Dec. 26, 1991 [JP] Japan .................. 3-356844

[51] Int. Cl.$^5$ .............................................. C08K 3/34
[52] U.S. Cl. ........................... 524/411; 524/114; 524/412; 524/451; 524/456
[58] Field of Search ............... 524/114, 451, 456, 410, 524/411, 412

[56] References Cited

U.S. PATENT DOCUMENTS

| 3,764,576 | 10/1973 | Russo | 524/456 |
|---|---|---|---|
| 4,189,422 | 2/1980 | Wakeford | 524/456 |
| 4,203,887 | 5/1980 | Goedde et al. | 524/456 |
| 4,460,731 | 7/1984 | Kochanowski et al. | 524/451 |
| 4,588,085 | 12/1985 | Lee | 524/456 |
| 4,820,347 | 4/1989 | Weber | 524/451 |
| 4,983,660 | 1/1991 | Yoshida et al. | 524/456 |
| 5,030,680 | 7/1991 | Wilder et al. | 524/456 |

FOREIGN PATENT DOCUMENTS

0295336 12/1988 European Pat. Off. .
2545568 4/1976 Netherlands .

*Primary Examiner*—Veronica P. Hoke

[57] ABSTRACT

Resin compositions comprising (A) a polyester, (B) a flame retardant, (C) an antimony compound, and (D) a filler selected from the group comprising magnesium silicate and mixtures of magnesium silicate with calcium metasilicate are disclosed. The disclosed compositions exhibit superior heat resistance, flame retardance, arc resistance and tracking resistance.

17 Claims, No Drawings

REINFORCED FLAME-RETARDANT POLYESTER RESIN COMPOSITIONS

The present invention relates to reinforced flame-retarded polyester resin compositions, and more specifically to reinforced flame-retardant polyester resin compositions that are useful as molding materials in electrical components.

BACKGROUND OF THE INVENTION

Non-crystalline plastics such as polycarbonates, polyphenylene ethers and ABS resins have inadequate heat resistance, chemical resistance and arc resistance. On the other hand, crystalline plastics such as polyesters and polyolefins do by themselves have sufficient arc resistance and tracking resistance, but their flame retardance and heat resistance are inadequate. In polyesters, it is known that sufficient flame retardance and heat resistance can be obtained by the addition of fillers such as halogen-antimony flame retardants and glass fibers. However, a notable decrease in the arc resistance and the tracking resistance can be observed as side effects of these additives.

The object of the present invention is to provide a polyester resin composition having a good arc resistance and tracking resistance, as well as a sufficient heat resistance and flame retardance.

SUMMARY OF THE INVENTION

The present invention provides a resin composition comprising (A) a polyester, (B) a flame retardant, (C) antimony oxide or an antimonate and (D) a filler, which filler includes plate-like magnesium silicate filler having an average particle size of 2.2 μm or less, or both this and acicular calcium metasilicate filler.

Known aromatic polyester resins can be used as the polyester resin employed in this invention. Here, the aromatic polyester resin is a polyester having an aromatic ring at the chain unit of the polymer. This is a polymer or copolymer that can be obtained by means of a polycondensation reaction in which an aromatic dicarboxylic acid and a diol (or the ester-forming derivatives thereof) serve as the main ingredients.

Examples of aromatic dicarboxylic acids that can be cited include terephthalic acid, isophthalic acid, o-phthalic acid, 1,5-naphthalenedicarboxylic acid, naphthalene-2,5-dicarboxylic acid, naphthalene-2,6-dicarboxylic acid, biphenyl-2,2'-dicarboxylic acid, biphenyl-3,3'-dicarboxylic acid, biphenyl-4,4'-dicarboxylic acid, diphenylether-4,4'-dicarboxylic acid, diphenylmethane-4,4'-dicarboxylic acid, diphenylsulfone-4,4'-dicarboxylic acid, diphenylisopropylidene-4,4'-dicarboxylic acid, 1,2-bis(phenoxy)ethane-4,4'-dicarboxylic acid, anthracene-2,5-dicarboxylic acid, anthracene-2,6-dicarboxylic acid, p-terphenylene-4,4'-dicarboxylic acid and pyridine-2,5-dicarboxylic acid. Of these, the use of terephthalic acid is especially desirable.

Two or more of these aromatic dicarboxylic acids may be mixed and used. Also, one or more aliphatic dicarboxylic acids such as adipic acid, azelaic acid, dodecanedioic acid and sebacic acid or alicyclic dicarboxylic acids such as cyclohexanedicarboxylic acid may be mixed and used in small amounts together with these aromatic dicarboxylic acids.

Examples that may be cited of the diol component include aliphatic diols such as ethylene glycol, propylene glycol, butylene glycol, hexylene glycol, neopentyl glycol, 2-methylpropane-1,3-diol, diethylene glycol and triethylene glycol; alicyclic diols such as cyclohexane-1,4-dimethanol; and mixtures thereof. Also, a small amount of one or more long-chain diols having a molecular weight of 400–6000 may be copolymerized; examples of these include polyethylene glycol, poly-1,3-propylene glycol and polytetramethylene glycol.

Specific examples of aromatic polyester resins that can be cited include polyethylene terephthalate (PET), polypropylene terephthalate, polybutylene terephthalate (PBT), polyethylene naphthalate, polybutylene naphthalate, polyethylene-1,2-bis(phenoxy)ethane-4,4'-dicarboxylate, and polycyclohexane dimethanol terephthalate. Copolymeric polyesters such as polyethylene isophthalate/terephthalate, polybutylene terephthalate/isophthalate and polybutylene terephthalate/-decane dicarboxylate may also be cited. Of these, the use of polybutylene terephthalate is preferable.

Next, the flame retardant (B) used in this invention may be a halogen-based flame retardant such as tetrabromobisphenol A oligomer, polybromophenyl ether, brominated polystyrene, brominated epoxide, brominated imide and brominated polycarbonate. Of these, the use of a brominated epoxide is preferable.

Examples that may be cited of the antimony oxide (C) include antimony trioxide ($Sb_2O_3$) and antimony pentaoxide ($Sb_2O_5$). Examples of antimonates that may be cited include sodium antimonate ($NaSbO_5$).

In this invention, the ingredients are included in the following amounts, based on 100 parts by weight of the overall resin composition: 20–75 parts by weight, and preferably 30–65 parts by weight, of component (A); 5–20 parts by weight, and preferably 8–16 parts by weight, of component (B); and 2–6 parts by weight, and preferably 3–5 parts by weight, of component (C). When the amount of component (A) is less than 20 parts by weight, the molded product becomes brittle; on the other hand, when this is greater than 75 parts by weight, a polyester having the desired properties cannot be obtained. When component (B) is less than 5 parts by weight, a sufficient flame retardance cannot be obtained; when this is more than 20 parts by weight, large additional effects cannot be expected and a decline occurs in the physical properties. When the amount of component (C) is less than 2 parts by weight, a sufficient flame retardance cannot be obtained; on the other hand, the use of more than 6 parts by weight does not result in greater effects.

A distinctive feature of this invention is the fillers (D) used. A plate-like magnesium silicate filler having an average particle size of 2.2 μm or less and an acicular calcium metasilicate filler are used. The average particle size of the plate-like magnesium silicate filler is preferably 1.8 μm or less, and most preferably 1.3 μm or less. When the average particle size is greater than 2.2 μm, the tracking resistance-improving effect is small. The use of talc as the plate-like magnesium silicate filler is preferable; examples include commercial products available from the Fuji Talc Co. under trademarks such as KLM-100, KLM-200 and KLM-300. Wollastonite is preferable as the acicular calcium metasilicate filler; one example is the product having the trademark Kemolit ASB available from Nagase & Co., Ltd. The plate-like magnesium silicate filler and the acicular calcium metasilicate filler may be used in any mixing ratio, although it is preferable that the ratio of the plate-like magnesium silicate filler to the acicular calcium metasilicate filler range from 40/60 to 90/10 (weight ratio).

Common fillers other than the above can also be included in small amounts within the filler (D).

Component (D) is included in an amount of 15-75 parts by weight, and preferably 20-50 parts by weight, per 100 parts by weight of the overall resin composition. When there is less than 15 parts by weight of component (D), the effects are inadequate; when more than 70 parts by weight of component (D) is used, the molded products become brittle.

In addition, other resins, various rubbers and common additives such as pigments, dyes, heat-resisting agents, antioxidants, antiweathering agents, lubricants, release agents, crystal nucleating agents, plasticizers and antistatic agents may be added to the resin compositions of this invention in accordance with the desired aim during resin mixture or molding, provided this does not adversely affect the physical properties thereof.

There are no particular restrictions on the method for preparing the resin compositions of this invention, it being possible to use with good effects a conventional method. While the use of a small amount of solvent is possible, this is generally not necessary. Examples that may be cited of the equipment used include in particular extruders, Banbury mixers, rollers and kneaders. These may be operated either continuously or in a batch-wise manner.

The resin compositions of this invention have excellent heat resistance, arc resistance, tracking resistance and flame retardance. They have a heat-distortion temperature greater than 120° C.; an arc resistance, according to ASTM D495, that is greater than 60 seconds, and preferably greater than 120 seconds; a wet comparative tracking index (CTI) greater than 400 V, and preferably at least 600 V; and a flame retardance, based on UL 94, of V-O.

The resin compositions of this invention can be used as molding compositions for active electrical components used in air conditioners, refrigerators, TVs, audio equipment, automobiles, washers, dryers and the like. For example, they can be used as switches, terminals, relay coil bobbins and their cases, high-pressure coil bobbins and their cases, cathode-ray tube deflection yokes and the like. These compositions are especially useful when employed in active electrical components/members situated in close proximity to high voltages and in high-temperature, high-humidity environments.

In the area of electrical components, the values recognized by the Underwriters Laboratories Inc. (a nominal grades ranging from 0 to 7 or from 0 to 5 is given as the PLC grades) are generally used as the official values for the arc resistance and the tracking resistance. The grades assigned to the arc resistance and the tracking resistance are defined in Tables 1 and 2. The arc resistance is measured based on ASTM D495, and the tracking resistance is measured as the wet comparative tracking index (CTI).

TABLE 1

| Average time of arc resistance (TAR) in D495 range (seconds) | PLC Assigned |
| --- | --- |
| $420 \leq TAR$ | 0 |
| $360 \leq TAR < 420$ | 1 |
| $300 \leq TAR < 360$ | 2 |
| $240 \leq TAR < 300$ | 3 |
| $180 \leq TAR < 240$ | 4 |
| $120 \leq TAR < 180$ | 5 |
| $60 \leq TAR < 120$ | 6 |

TABLE 1-continued

| Average time of arc resistance (TAR) in D495 range (seconds) | PLC Assigned |
| --- | --- |
| $0 \leq TAR < 60$ | 7 |

TABLE 2

| Tracking index (TI) in CTI range (volts) | PLC Assigned |
| --- | --- |
| $600 \_ TI$ | 0 |
| $400 \_ TI \quad 600$ | 1 |
| $250 \_ TI \quad 400$ | 2 |
| $175 \_ TI \quad 250$ | 3 |
| $100 \_ TI \quad 175$ | 4 |
| $0 \_ TI \quad 100$ | 5 |

The use of a resin having a higher grade (closer to 0) increases the safety in the final product. Also, because fire and casualty insurance is normally applied to products for this type of functional component, when a higher PLC is obtained the premiums become much lower. Prior-art polyester resins had an arc resistance of PLC 7 and a tracking resistance of PLC 3, but the resin compositions of the present invention have an arc resistance of PLC 5 and a tracking resistance of PLC 0. Based on this, the safety of the products can be greatly increased and the total costs can be lowered; hence, the social benefits of using the resin compositions according to the present invention are very large.

DETAILED DESCRIPTION OF THE PREFERRED EMBODIMENTS

The present invention shall now be illustrated more concretely by means of examples, although it shall be understood that this invention is in no way restricted by these examples.

The following compounds were used in the examples.

Component A: The polyester known as polybutylene terephthalate (trademark, Valox 310; GE Plastics Japan KK), abbreviated below as PBT.

Component B: Brominated epoxide (trademark, SR-T5000; Sakamoto Yakuhin Kogyo KK).

Component C: Antimony trioxide ($Sb_2O_3$).

Component D:
 Wollastonite: Kemolit ASB (trademark of Tatsumori KK)
 Talc 1: KLM-100 (trademark of Fuji Talc KK), average particle size, 2.2 μm.
 Talc 2: KLM-200 (trademark of Fuji Talc KK), average particle size, 1.8 μm.
 Talc 3: KLM-300 (trademark of Fuji Talc KK), average particle size, 1.3 μm.
 Glass fiber (used for the sake of comparison).

Optional Components:
 Stabilizer: MARK AO-50 (Asahi Denka Kogyo KK)

EXAMPLES 1-6 AND COMPARATIVE EXAMPLES 1-6

The ingredients in the amounts (parts by weight) indicated in Table 1 were extruded using a twin-screw extruder (screw diameter, 30 mm) at a barrel temperature setting of 260° C. and a speed of 200 rpm, thereby giving pellets. Test pieces for measuring various physical properties were injection molded from these pellets, then submitted to the following tests. The results are given in Table 3.

Arc Resistance Test: Measured in accordance with ASTM D495.

Tracking Resistance Test: The wet comparative tracking index (CTI) was measured in general accordance with IEC.

Flame Retardancy Test: UL 94/VO, VI, and VII Tests

Five test rods were tested at a thickness of 1/16 inch according to the test method indicated in "Combustion Test for Material Classification" (Underwriters Laboratories Inc. Bulletin 94; hereinafter, UL-94). According to this test method, the material furnished for testing was graded as UL-94 V-0, V-I or V-II based on the results for 5 samples. The criteria for the various V grades in UL-94 are briefly given below.

V-0: The flame retention time after removal of the ignition flame is 10 seconds or less, the total fire retention time is 50 seconds or less, and none of the samples drop sparks that set fire to absorbent cotton.

V-I: The flame retention time after removal of the ignition flame is 30 seconds or less, the total fire retention time is 250 seconds or less, and none of the samples drop sparks that set fire to absorbent cotton.

V-II: The flame retention time after removal of the flame is 30 seconds or less, the total fire retention time is 250 seconds or less, and all the sample drop sparks that set fire to absorbent cotton.

UL-94 stipulates that unless all the test rods pass a given V grade, none shall not be classified in the grade. In cases where these conditions are not satisfied, all five test rods are assigned to the grade of the test rod for which the worst results were obtained. For example, when one test rod was classified as V-II, the grades for all five test rods became V-II.

Heat Resistance Test: The heat distortion temperature (HDT) was measured under a load of 18.6 kg/cm$^2$ in accordance with ASTM D648.

The polyester resin compositions of this invention have a good arc resistance and tracking resistance, in addition to which they have a sufficient heat resistance and flame retardance. Hence, these have a high safety even when used in products such as electrical components, and are thus industrially very useful.

magnesium silicate filler having an average particle size of 1.8 μm or less, and acicular calcium metasilicate filler.

2. A resin composition comprising
 (A) a polyester;
 (B) a flame retardant;
 (C) an antimony compound; and
 (D) a filler comprising plate-like magnesium silicate filler having an average particle size of 1.8 μm or less and acicular calcium metasilicate filler.

3. A composition according to claim 2 wherein said antimony compound is selected from the group comprising antimony oxides and antimonates.

4. A composition according to claim 2 wherein said polyester is a polymer or copolymer obtained by polycondensation of an aromatic dicarboxylic acid and a diol.

5. A composition according to claim 4 wherein said polyester is selected from the group comprising polyethylene terphthalate (PET), polypropylene terephthalate, polybutylene terephthalate (PBT), polyethylene naphthalate, polybutylene naphthalate, polyethylene-1,2-bis (phenoxy) ethane-4,4'-dicarboxylate, polycyclohexane dimethanol terphthalate, polyethylene isophthalate/terephthalate, polybutylene terephthalate/isophthalate and polybutylene terephthalate/-decane dicarboxylate.

6. A composition according to claim 2 wherein said flame retardant is halogen-based and selected from the group comprising brominated epoxide, tetrabromobisphenol A oligomer, polybromophenyl ether, brominated polystyrene, brominated imide and brominated polycarbonate.

7. A composition according to claim 2 having a heat distortion temperature greater than 120° C.

8. A composition according to claim 2 having an arc resistance greater than 60 seconds.

9. A composition according to claim 2 having a wet comparative tracking index greater than 600 V.

10. A composition according to claim 2 having a flame retardance of V-O.

11. A composition according to claim 2 wherein said

TABLE 3

| | Examples | | | | | | Comparative Examples | | | | | |
|---|---|---|---|---|---|---|---|---|---|---|---|---|
| | 1 | 2 | 3 | 4 | 5 | 6 | 1 | 2 | 3 | 4 | 5 | 6 |
| Ingredients (parts by weight) | | | | | | | | | | | | |
| PBT | 39.8 | 39.8 | 39.8 | 49.8 | 49.8 | 49.8 | 100 | 70 | 80 | 50 | 64.8 | 49.8 |
| Halogen-based flame retardant | 16 | 16 | 16 | 16 | 16 | 16 | — | — | 16 | 16 | 16 | 16 |
| Sb$_2$O$_3$ | 4 | 4 | 4 | 4 | 4 | 4 | — | — | 4 | 4 | 4 | 4 |
| Stabilizer | 0.2 | 0.2 | 0.2 | 0.2 | 0.2 | 0.2 | 0.2 | 0.2 | 0.2 | 0.2 | 0.2 | 0.2 |
| Wollastonite | 10 | 10 | 10 | — | — | — | — | — | — | — | 15 | 30 |
| Talc 1 | 30 | — | — | 30 | — | — | — | — | — | — | — | — |
| Talc 2 | — | 30 | — | — | 30 | — | — | — | — | — | — | — |
| Talc 3 | — | — | 30 | — | — | 30 | — | — | — | — | — | — |
| Glass fibers | — | — | — | — | — | — | — | 30 | — | 30 | — | — |
| Tests | | | | | | | | | | | | |
| Arc resistance (seconds) | 110 | 130 | 140 | 105 | 120 | 120 | 190 | 130 | 60 | 25 | 50 | 80 |
| Tracking resistance (volts) | 400 | >600 | >600 | 390 | 460 | 590 | >600 | 400 | 180 | 180 | 400 | 500 |
| UL-94400 | V-0 | V-0 | V-0 | V-0 | V-0 | V-0 | — | — | V-0 | V-0 | V-0 | V-0 |
| HDT (°C.) | 200 | 200 | 200 | 200 | 200 | 200 | 60 | 200 | 80 | 200 | 100 | 160 |

Dashes (—) mean that the value falls outside of the specifications.

We claim:

1. A resin composition comprising (A) a polyester, (B) a flame retardant, (C) antimony oxide or an antimonate and (D) a filler, which filler includes plate-like plate-like magnesium silicate filler and said acicular calcium metasilicate filler are present in the composition in a weight ratio of from 40/60 to 90/10.

12. A resin composition comprising
(A) from about 20-75 parts by weight of a polyester;
(B) from about 5-20 parts by weight of a flame retardant;
(C) from about 2-6 parts by weight of an antimony compound; and
(D) from about 15 to 75 parts by weight of a filler, wherein said filler comprises plate-like magnesium silicate filler having an average particle size of 1.8 μm or less and acicular calcium metasilicate filler.

13. A composition according to claim 12 wherein said plate-like magnesium silicate is talc.

14. A composition according to claim 12 wherein said acicular calcium metasilicate is wollastonite.

15. A composition according to claim 12 wherein said plate-like magnesium silicate filler and said acicular calcium metasilicate filler are present in the composition in a weight ratio of from 40/60 to 90/10.

16. A composition according to claim 12, wherein said composition consists essentially of said polyester, said flame retardant, said antimony compound and said filler.

17. A composition according to claim 12, wherein said composition consists of said polyester, said flame retardant, said antimony compound and said filler.

* * * * *